(12) United States Patent
Wang

(10) Patent No.: US 11,017,253 B2
(45) Date of Patent: May 25, 2021

(54) LIVENESS DETECTION METHOD AND APPARATUS, AND STORAGE MEDIUM

(71) Applicant: BEIJING BYTEDANCE NETWORK TECHNOLOGY CO., LTD., Beijing (CN)

(72) Inventor: Xu Wang, Beijing (CN)

(73) Assignee: Beijing Bytedance Network Technology Co., Ltd., Beijing (CN)

(*) Notice: Subject to any disclaimer, the term of this patent is extended or adjusted under 35 U.S.C. 154(b) by 0 days.

(21) Appl. No.: 17/021,134

(22) Filed: Sep. 15, 2020

(65) Prior Publication Data

US 2020/0410269 A1 Dec. 31, 2020

Related U.S. Application Data

(63) Continuation of application No. PCT/CN2019/095080, filed on Jul. 8, 2019.

(30) Foreign Application Priority Data

Dec. 18, 2018 (CN) .......................... 201811548844.4

(51) Int. Cl.
*G06K 9/00* (2006.01)

(52) U.S. Cl.
CPC ..... *G06K 9/00906* (2013.01); *G06K 9/00228* (2013.01); *G06K 9/00281* (2013.01); *G06K 9/00744* (2013.01)

(58) Field of Classification Search
CPC ........... G06K 9/00906; G06K 9/00228; G06K 9/00281; G06K 9/00744
See application file for complete search history.

(56) References Cited

U.S. PATENT DOCUMENTS

| 10,693,872 B1* | 6/2020 | Larson .................. G06F 21/31 |
| 2010/0158319 A1* | 6/2010 | Jung .................. G06K 9/00899 |
| | | 382/106 |

(Continued)

FOREIGN PATENT DOCUMENTS

| CN | 1842296 A | 10/2006 |
| CN | 103440479 A | 12/2013 |

(Continued)

OTHER PUBLICATIONS

International Search Report and Written Opinion dated Oct. 9, 2019 for PCT Patent Application PCT/CN2019/095080.

(Continued)

*Primary Examiner* — Santiago Garcia
(74) *Attorney, Agent, or Firm* — Thomas Horstemeyer, LLP

(57) ABSTRACT

Provided are a liveness detection method and apparatus, an electronic device and a storage medium. The method includes: in a case of satisfying a liveness detection starting condition, acquiring (S110) an image frame in a video in real time; recognizing (S120) at least two organ regions of a user in the image frame, and updating a feature value set corresponding to each recognized organ region according to a feature value calculated based on the recognized organ region corresponding to the feature value set; and performing (S130) a liveness detection on the user according to data features in a combination set formed by at least two feature value sets corresponding to the at least two organ regions and extremum conditions respectively corresponding to the at least two feature value sets.

15 Claims, 4 Drawing Sheets

(56) References Cited

U.S. PATENT DOCUMENTS

| | | | | |
|---|---|---|---|---|
| 2015/0098633 | A1* | 4/2015 | Kato | G06K 9/00845 |
| | | | | 382/118 |
| 2017/0048244 | A1* | 2/2017 | Loughlin-McHugh | |
| | | | | G06K 9/0061 |
| 2018/0239955 | A1* | 8/2018 | Rodriguez | G06F 21/32 |
| 2018/0349682 | A1* | 12/2018 | Wong | G06K 9/00906 |
| 2019/0026544 | A1* | 1/2019 | Hua | A61B 5/1128 |
| 2019/0205680 | A1* | 7/2019 | Miu | G06K 9/00268 |
| 2020/0097643 | A1* | 3/2020 | Uzun | G06K 9/00899 |
| 2020/0309930 | A1* | 10/2020 | Zhou | G01S 15/32 |

FOREIGN PATENT DOCUMENTS

| | | |
|---|---|---|
| CN | 103679118 A | 3/2014 |
| CN | 105184246 A | 12/2015 |
| CN | 106897658 A | 6/2017 |
| CN | 107330914 A | 11/2017 |
| CN | 107346422 A | 11/2017 |
| CN | 107748876 A | 3/2018 |
| CN | 109635757 A | 4/2019 |
| WO | 2017139325 A1 | 8/2017 |

OTHER PUBLICATIONS

1st Search Report dated Jun. 14, 2019 for Chinese Patent Application No. 201811548844.4.

1st Office Action dated Jun. 20, 2019 for Chinese Patent Application No. 201811548844.4.

Supplementary Search dated Sep. 6, 2019 for Chinese Patent Application No. 201811548844.4.

Zeng Cheng; et al."Face Liveness Multi-attribute Detection Via Multi-task CNN" Science Technology and Engineering vol. 16 No. 32 (2016).

Pan Hailing "In vivo detection technology in face recognition system" Science & Technology Information No. 10 (2015).

* cited by examiner

LIVENESS DETECTION METHOD AND APPARATUS, AND STORAGE MEDIUM

CROSS REFERENCE TO RELATED APPLICATIONS

This is continuation of International Patent Application No. PCT/CN2019/095080, filed on Jul. 8, 2019, which is based on and claims priority to Chinese Patent Application No. 201811548844.4 filed with the CNIPA on Dec. 18, 2018, disclosures of which are incorporated herein by reference in their entireties.

TECHNICAL FIELD

Embodiments of the present disclosure relate to data technologies, for example, to a liveness detection method and apparatus, and a storage medium.

BACKGROUND

People tend to be required to perform identity authentication in various activities so that the security of information is ensured. With the development of computers and networks, the popularity of Internet electronic devices has made identity authentication more efficient. In general, it is required in identity authentication to determine a to-be-photographed object as a living body.

In a financial system and a face recognition system, liveness determination is often necessary. In this process, a user is generally required to complete basic face actions, for example, nodding and/or shaking the user's head. The related art detects the changes of posture parameters of face parts (for example, eyes or mouth) in multiple photos including the user's face image to determine whether the user is a living user or not. At the same time, technologies such as face key-point positioning and face tracking are used to verify whether the user himself is operating.

However, with the development of network technology, it is very easy to copy the user's face in the form of photos or videos, thus causing a random attack on the detection system. For example, when a photo of a legitimate user is deflected left and right or up and down, the real left-right and up-down swinging motions of the user's head can be simulated, causing the user's photo to be misdetermined as a living body. Alternatively, when a synthetic video containing the face postures of a legitimate user is played, the real face postures of the user can be simulated. Neither of the preceding two methods can guarantee the accuracy of liveness detection and therefore reduce the security of identity authentication.

SUMMARY

The present disclosure provides a liveness detection method and apparatus, an electronic device, and a storage medium, which can accurately recognize a living body and improve the security of identity authentication.

In the present disclosure, a liveness detection method is provided. The method includes steps below.

An image frame in a video is acquired in real time when a liveness detection starting condition is satisfied.

At least two organ regions of a user are recognized in the image frame, and a feature value set corresponding to each of the at least two recognized organ regions is updated according to a feature value calculated based on the recognized organ region corresponding to the feature value set, where each organ region corresponds to at least one feature value set, each of the at least one feature value set corresponds to one extremum condition and each of the at least one feature value set includes at least one feature value.

A liveness detection is performed on the user according to data features in a combination set formed by at least two feature value sets corresponding to the at least two organ regions and extremum conditions respectively corresponding to the at least two feature value sets.

In an embodiment, the present disclosure further provides a liveness detection apparatus, and the liveness detection apparatus includes a real-time image frame acquisition module, a feature value set update module and a liveness determination module. The real-time image frame acquisition module is configured to acquire an image frame in a video in real time when a liveness detection starting condition is satisfied. The feature value set update module is configured to recognize, in the image frame, at least two organ regions of a user, and update a feature value set corresponding to each of the at least two recognized organ regions according to a feature value calculated based on the recognized organ region corresponding to the feature value set, where each organ region corresponds to at least one feature value set, each of the at least one feature value set corresponds to one extremum condition, and each of the at least one feature value set includes at least one feature value. The liveness determination module is configured to perform a liveness detection on the user according to data features in a combination set formed by at least two feature value sets corresponding to the at least two organ regions and extremum conditions respectively corresponding to the at least two feature value sets.

In the present disclosure, an electronic device is provided. The electronic device includes one or more processors and a memory configured to store one or more programs. When executed by the one or more processors, the one or more programs cause the one or more processors to perform the method of the present disclosure.

In the present disclosure, a computer-readable storage medium storing a computer program is provided. When executed by a processor, the program causes the processor to perform the method of the present disclosure.

DETAILED DESCRIPTION

Figure 1:
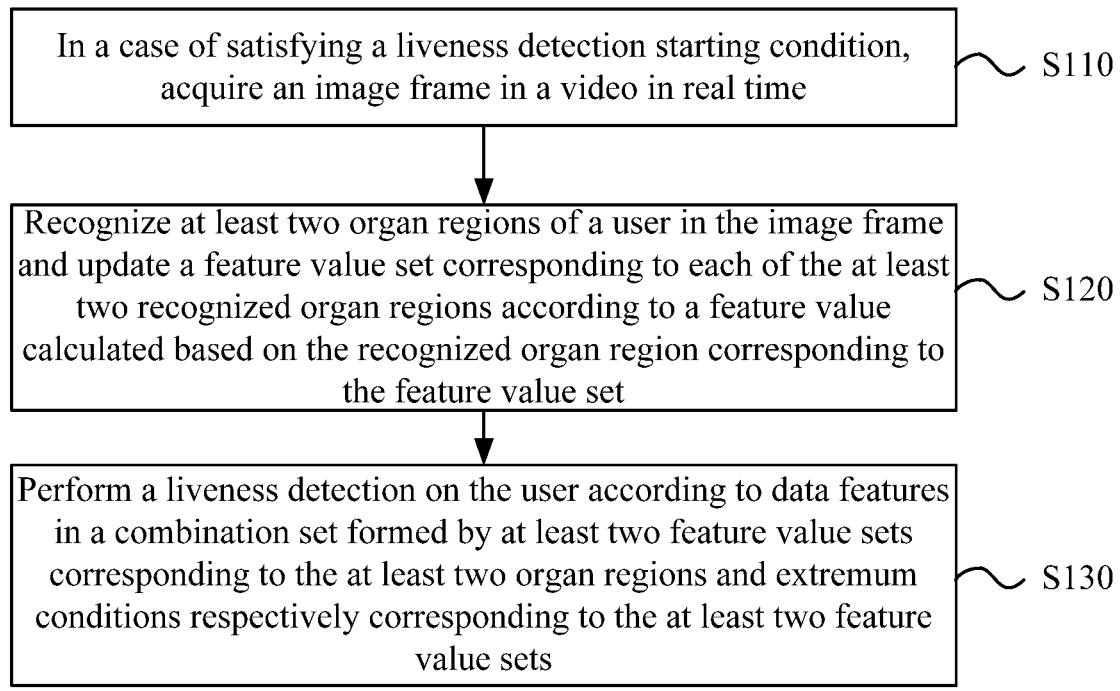
FIG. 1 is a flowchart of a liveness detection method according to an embodiment one of the present disclosure.

Hereinafter the present disclosure will be described in conjunction with the drawings and embodiments. The embodiments described herein are only intended to explain the present disclosure and not to limit the present disclosure. For convenience of description, only a part, not all, of structures related to the present disclosure are illustrated in the drawings.

Embodiment One

FIG. 1 is a flowchart of a liveness detection method provided in the embodiment one of the present disclosure. This embodiment is applicable to detecting whether a user in a real-time recorded video is a living body. The method may be performed by a liveness detection apparatus, which may be implemented by software and/or hardware and disposed in an electronic device, such as a computer. As shown in FIG. 1, the method includes S110 to S130.

In S110, when a liveness detection starting condition is satisfied, an image frame in a video is acquired in real time. The liveness detection starting condition may refer to a condition for determining to start an execution of a liveness detection operation. Exemplarily, when a starting instruction of the liveness detection is received, it is determined that the liveness detection starting condition is satisfied.

Generally speaking, a video is formed by a series of static image frames which are continuously projected at an extremely fast speed. Thus, the video may be split into a series of image frames, each of which may be served as an image. In this embodiment of the present disclosure, the image frame is an image including a user face image. In the liveness detection, a video including a user's face is recorded, and information about the user's face is acquired according to image frames in the video.

The liveness detection is usually a real-time detection process. Therefore, the video is a video that is being recorded in real time. Each image frame recorded by the video may be acquired and processed in real time so as to ensure timeliness of the liveness detection.

In S120, at least two organ regions of a user are recognized in the image frame, and a feature value set corresponding to each of the at least two recognized organ regions is updated according to a feature value calculated based on the recognized organ region corresponding to the feature value set, where each organ region corresponds to at least one feature value set, each feature value set corresponds to one extremum condition and each feature value set includes at least one feature value. The organ region may refer to a region where an organ in the user's face is located. For example, the organ region includes at least one of following items: an eye region, a mouth region and a nose region.

Usually, it is necessary to determine whether a face posture captured in the video is consistent with posture features of a living body. In an embodiment, the face posture action detection may be realized through one or more key points of the face, and whether a user is a living body is determined based on this face posture action detection. The key points may include key points of the left eyeball, corners of the mouth, nostrils, eyebrow tail and face contour. The key points may be recognized by a pre-trained machine learning model, or by other methods, such as the method based on the active shape model (ASM), which is not limited in the embodiments of the present disclosure.

According to the key points recognized in each organ region, the feature value of each organ region may be calculated. Alternatively, if the organ region is the eye region, the feature value of the organ region includes a closing value of the eye region; if the organ region is the mouth region, the feature value of the organ region includes an opening or closing degree of the mouth region; if the organ region is the nose region, the feature value of the organ region includes a pitch angle and/or a rotation angle of the nose region. Moreover, the feature value of the nose region may also include a yaw angle. The feature value may be determined according to a relative position between multiple key points. For example, the closing value of the eye region may be a distance between a highest key point of the eyeball and a lowest key point of the eyeball. Moreover, a corresponding machine learning model may be respectively trained for each feature value to calculate the feature value, or the method for calculating the feature value according to the key points may be determined according to user requirements.

The calculated feature value of each organ region in the image frame is respectively added to at least one feature value set matching the each organ region, and the at least one feature value set is updated in real time. Each feature value set may store a fixed number of feature values, and each feature value set may have a same or different matching number of feature values. In an embodiment, each feature value set may be considered as a queue, in which a redundant feature value is deleted in the front of the queue and a new feature value is inserted in the end of the queue, and each queue may have a same or different storage space.

In an embodiment, the feature value of the eye region is the closing value, and the corresponding feature value set is a closing value set; the feature value of the mouth region is the opening or closing degree, and the corresponding feature value set is an opening or closing degree set; the feature value of the nose region is the pitch angle, the rotation angle and the yaw angle, and the corresponding feature value set is a pitch angle set, a rotation angle set and a yaw angle set. Exemplarily, the closing value set stores up to 5 feature values, the pitch angle set stores up to 15 feature values, and the rotation angle set stores up to 15 feature values. The extremum condition may be a condition which defines feature value thresholds of feature value sets used for recognizing a face posture. The extremum condition is associated with a number of feature values in each feature value set and a unit of the feature values in each feature value set, so that a feature value set corresponds to one extremum condition, different feature value sets may have same or different extremum conditions. For example, different feature value sets store different feature values, which represent different face postures, and correspondingly, different feature value sets have different extremum conditions.

Alternatively, the step in which the feature value corresponding to each of the at least two recognized organ regions is updated according to the feature value calculated based on the each recognized organ region may include steps described below. When each recognized organ region in the target image frame satisfies a non-obstruction condition, a feature value matching each organ region in the target image frame is calculated separately, and the feature value is updated and stored in a feature value set corresponding to the organ region matching the feature value.

In an embodiment, the non-obscuration condition refers to a condition which defines that a recognized organ region in the image frame is not covered or obscured by other objects. An obscuration determination is performed on an acquired image frame in real time, after the determination of the current image frame acquired in real time is completed, the determination is ended in a case of acquiring no further image frame; and the obscuration determination is continued for an image frame in a case where the image frame is acquired again. Every time an image frame, which has passed the obscuration determination, is acquired, all feature value sets are updated once. With the real-time video recording, image frames are continuously acquired in real time, so the feature value sets are constantly updated, which makes the liveness detection to be time-based.

Through the real-time acquisition of the image frame in the video recording the user's face image, the obscuration determination of organ regions is performed for each image frame, and when all organ regions satisfy the non-obscuration condition, according to the real-time update of at least one feature value set corresponding to at least one organ region, the situation that using photos to pass through the liveness detection can be avoided. The accuracy rate of the liveness detection can be improved according to the updated feature value sets, so as to improve the security of identity authentication.

In an embodiment, the step in which the image frame each organ region recognized in which satisfies the non-obscuration condition is determined as the target image frame may include steps described below. The image frame is inputted into a pre-trained obscuration determination network model matching each organ region, and an obscuration determination result output by the obscuration determination network model, of the organ region in the image frame is acquired; when the obscuration determination result of the organ region is non-obscured, it is determined that the organ region satisfies the non-obscuration condition; when each organ region recognized in the image frame satisfies the non-obscuration condition, the image frame is determined as the target image frame.

The obscuration determination network model may be a machine learning model. In an embodiment, corresponding obscuration images for each organ region are acquired as training samples to train the obscuration determination network model matching the organ region. The image frame is input into an obscuration determination network model matching the organ region, and the obscuration determination result, output by this model, matching the organ region in the image frame may be acquired. When the obscuration determination result of all organ regions recognized in the image frame is non-obscured, it is determined that each recognized organ region in the image frame satisfies the non-obscuration condition, and the image frame is determined as the target image frame. The obscuration determination of each organ region in the image frame is realized through the obscuration determination network model, which can improve the accuracy rate of the obscuration determination of each organ region, so as to perform the liveness detection without obscuration in each organ region, and improve the accuracy of the liveness detection.

In S130, a liveness detection on the user is performed according to data features in a combination set formed by at least two feature value sets corresponding to at least two organ regions and extremum conditions respectively corresponding to the at least two feature value sets.

The data features may refer to variation feature information about a data magnitude. The combination set formed by the at least two feature value sets may refer to a combination set formed by at least two feature value sets. Based on requirements of the liveness detection, at least two feature value sets matching a liveness detection condition may be selected from the feature value sets matching the at least two organ regions to generate the combination set.

In an embodiment, the liveness detection includes at least one of following items: an eye opening or closing action, a mouth opening or closing action, or a head nodding or shaking action, that is, the liveness detection condition may be interpreted as a condition where a user performs an action included in the above actions. Generally, one action may be detected based on only one feature value set. When an illegitimate person uses the video of a legitimate user to simulate an action in the liveness detection, it is not possible to determine an action detection time sequence in the liveness detection, so that only the video of the legitimate user is repeatedly played until the action in the liveness detection appears in the video. Thus, when the liveness detection prompts to detect a target action, the above random video will show irrelevant actions which are irrelevant to the target action.

For example, in a detection process of any action, an eye blinking action will appear continuously, and it is to be understood that the eye blinking action is a natural continuous action of the user.

For another example, the liveness detection prompts a user to make a heading nodding action, but it is detected that the user makes a mouth opening or closing action. In fact, when a user performs the liveness detection, he will only make one action matching the liveness detection according to the liveness detection prompt.

Accordingly, in addition to the feature value set matching the action specified by the liveness detection, multiple additional feature value sets need to be detected, for example, when a proper action other than the specified action is detected, it is determined that the action verification passes; for another example, when an improper action other than the specified action is detected, it is determined that the user is not a living body. In an embodiment, it detects multiple feature value sets in the detection of the target action to determine whether a user has made the target action, and whether the user has made an improper action at the same time, and it is determined that the detection result of the target action is a verification failure when the user has made an improper action.

Therefore, it is feasible to determine the combination set formed by the at least two feature value sets according to each action set in the liveness detection, and determine, based on the data features and the extremum condition of each feature value set in each combination set, whether the user makes a set action or other improper actions, so as to archive the purpose of the liveness detection. In an embodiment, based on the data features in the combination set formed by the at least two feature value sets, a magnitude variation of feature values in the at least two feature value sets may be determined, thereby determining a posture variation, matching the magnitude variation of the feature values, of the at least two organ regions. When a magnitude of a feature value satisfies a corresponding extremum condition, the recognized organ region is determined to have made the action specified in the liveness detection, thus determining that the user is a living body.

In this embodiment of the present disclosure, the image frame in the video recording the user's face image is acquired in real time, and the feature value of each organ region recognized in each image frame is calculated, and the corresponding feature value set is updated. Multiple data features in the combination set formed by at least two feature value sets and the extremum condition corresponding to each of the at least two feature value sets are subjected to the liveness detection, which can jointly determine whether the user has performed an action specified in the liveness detection based on multiple associated feature value sets. The limitation of the liveness detection based on only one feature value set is avoided, and in the related art, using photos or videos to pass through the liveness detection is avoided, the misdetermination of the liveness detection is reduced, and the accuracy rate of the liveness detection and the security of identity authentication are improved.

Embodiment Two

Figure 2:
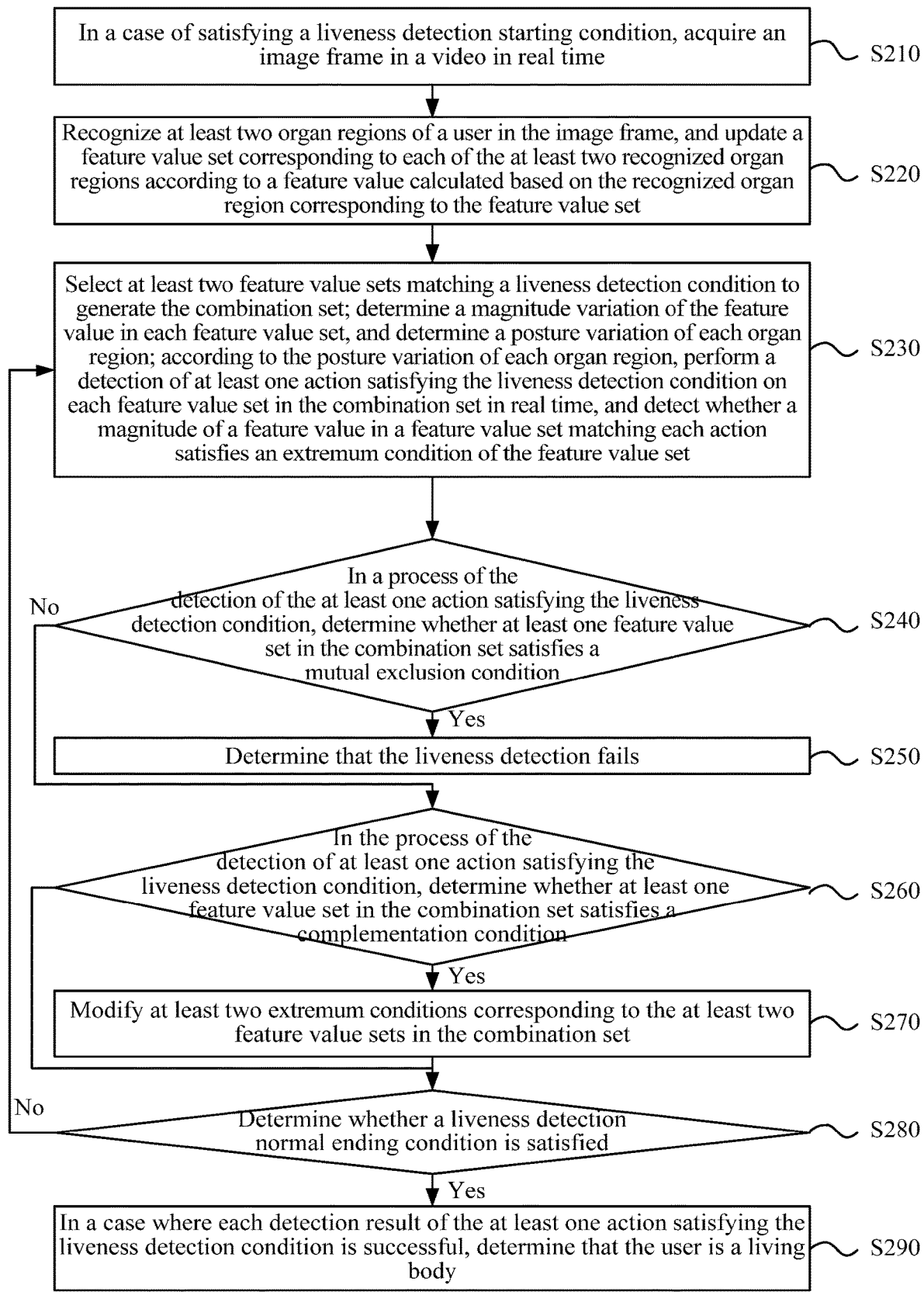
FIG. 2 is a flowchart of a liveness detection method according to an embodiment two of the present disclosure.

FIG. 2 is a flowchart of a liveness detection method provided in the embodiment two of the present disclosure.

This embodiment is based on one or more alternative schemes described above. In this embodiment, the step in which the liveness detection is performed on the user according to the data features in the combination set formed by at least two feature value sets corresponding to the at least two organ regions and the extremum conditions respectively corresponding to the at least two feature value sets includes steps described below, the at least two feature value sets matching a liveness detection condition are selected from feature value sets matching the at least two organ regions to generate the combination set; a magnitude variation of the feature value in each feature value set is determined according to the data features in the combination set, and a posture variation, matching the magnitude variation of the feature value in each feature value set, of each organ region is determined; a detection of at least one action satisfying the liveness detection condition is performed on each feature value set in the combination set in real time according to the posture variation of each organ region, and whether a magnitude of a feature value in a feature value set matching each action satisfies an extremum condition of the feature value set is detected; if it is determined that at least one feature value set in the combination set satisfies a mutual exclusion in a process of the detection of the at least one action satisfying the living detection condition, it is directly determined that the liveness detection fails; if it is determined that at least one feature value set in the combination set satisfies a complementation condition in the process of the detection of the at least one action satisfying the liveness detection condition, the at least two extremum conditions are modified; if it is determined that the liveness detection has ended normally, whether the user is a living body is determined according to a detection result of the at least one action satisfying the liveness detection condition. When each detection result of the at least one action satisfying the liveness detection condition is successful, it is determined that the user is a living body.

Accordingly, the method of this embodiment may include S210 to S290.

In S210, when the liveness detection starting condition is satisfied, an image frame in a video is acquired in real time. Terms including the liveness detection, video, image frame, organ region, feature value, feature value set, combination set, data feature, and extremum condition in this embodiment may all be described with reference to the preceding embodiments.

In S220, at least two organ regions of a user in the image frame are recognized, and a feature value set corresponding to each of the at least two recognized organ regions is updated according to a feature value calculated based on the recognized organ region corresponding to the feature value set, where each organ region corresponds to at least one feature value set, each feature value set corresponds to one extremum condition and each feature value set includes at least one feature value.

In an embodiment, when it is determined that each recognized organ region in the target image frame satisfies the non-obscuration condition, a feature value matching each recognized organ region in the target image frame is calculated respectively, and the feature value is updated and stored into a feature value set corresponding to the organ region matching the feature value set. When at least one recognized organ region in the image frame does not satisfy the non-obscuration condition, a next image frame is acquired for the obscuration determination. At this time, the feature value sets are not updated.

In S230, at least two feature value sets matching the liveness detection condition are selected from feature value sets matching the at least two organ regions to generate the combination set; according to the data features in the combination set, a magnitude variation of the feature value in each feature value set is determined, and a posture variation, matching the magnitude variation of the feature value in each feature value set, of each organ region is determined; according to the posture variation of each organ region, a detection of at least one action satisfying the liveness detection condition is performed on each feature value set in the combination set in real time, and whether a magnitude of a feature value in a feature value set matching each action satisfies an extremum condition of the feature value set is detected.

The action satisfying the liveness detection condition may refer to an action that needs to be detected in the defined liveness detection. When the detection result of all actions included in the liveness detection is successful, it is determined that the liveness detection is successful, that is, the user is a living body.

The extremum condition refers to a condition which defines a maximum feature value threshold and a minimum feature value threshold of a feature value set. Each feature value set may have different or same maximum feature value threshold and minimum feature value threshold defined in the extremum condition. When the maximum feature value determined by a feature value set is greater than the maximum feature value threshold, and the minimum feature value is less than the minimum feature value threshold, it is determined that the feature value set satisfies the extremum condition.

If a feature value set, matching the action satisfying the living detection condition, satisfies the corresponding extremum condition, the detection result of this action is determined to be successful. When the maximum feature value determined by the feature value set is greater than the maximum feature value threshold, and the minimum feature value is less than the minimum feature value threshold, it is determined that the feature value set satisfies the extremum condition. In an embodiment, if a third maximum feature value and a third minimum feature value determined by the feature value set, which matches the action satisfying the liveness detection condition, both satisfy an extremum condition corresponding to the feature value set, and the third maximum feature value, the third minimum feature value, and at least one feature value between the third maximum feature value and the third minimum feature value satisfy a monotone condition, it is determined that the detection result of the action is successful.

The monotone condition is a condition which defines that the magnitude variation of continuous feature values is monotonic. That the maximum feature value, the minimum feature value, and at least one feature value between the maximum feature value and the minimum feature value satisfy the monotone condition means that, the magnitude variation of feature values monotonically decreases from the maximum feature value to the minimum feature value, or the magnitude variation of the feature values monotonically increases from the minimum feature value to the maximum feature value.

According to the extremum condition and monotone condition, it is determined that there are the maximum feature value and the minimum feature value in the feature value set, and values between the maximum feature value and the minimum feature value continuously and monotonically vary, which means that the user has made a continuous and standard-compliant target action. Exemplarily, in the eye opening or closing action, the maximum feature value is a feature value when eyes are open and a distance between the upper and lower eyelids is maximal, the minimum feature value is a feature value when eyes are closed and a distance between the upper and lower eyelids is minimal, and the magnitude variation between the maximum feature value and the minimum feature value is a gradually reduced distance between the upper and lower eyelids, and the closing value set is determined as satisfying the eye opening or closing action.

In a case of satisfying the extremum condition and monotone condition at the same time, the detection result of the action satisfying the liveness detection condition is determined to be successful, which ensures that the user makes the action prompted by the liveness detection condition, and that the user makes the continuously action, so as to realize the accurate detection of the action.

In addition, if the feature value set of an action does not satisfy the requirements of the liveness detection condition, the real-time updated feature value sets are used to continue to determine whether the action satisfies the requirements of the liveness detection condition. If the detection time of the action ends, and the feature value set of the action still does not satisfy the requirements of the liveness detection condition, the detection result of the action is determined as a failure.

In S240, in the process of the detection of at least one action satisfying the liveness detection condition, it is determined whether a mutual exclusion condition is satisfied by at least one feature value set in the combination set, if so, S250 is executed; otherwise, S260 is executed.

In S250, it is determined that the liveness detection fails.

The mutual exclusion condition is a condition which defines that an action irrelevant to a currently detected action is detected. It is determined that at least one feature value set in the combination set satisfies the mutual exclusion condition, which represents that an action irrelevant to the detection action is detected, and the situation is determined to be simulated by photos or a random video, so that the liveness detection is determined as a failure.

Alternatively, the determination of at least one feature value set in the combination set satisfying the mutual exclusion condition may include steps described below, according to the mutual exclusion condition and the at least one action satisfying the liveness detection condition, a mutual exclusion group set is determined in the combination set; if a first maximum feature value and a first minimum feature value determined in at least one feature value set of the mutual exclusion group set both satisfy at least one extremum condition corresponding to the at least one feature value set, and the first maximum feature value, the first minimum feature value, and at least one feature value between the first maximum feature value and the first minimum feature value satisfy the monotone condition, it is determined that the at least one feature value set, matching the mutual exclusion condition, in the combination set satisfies the mutual exclusion condition.

The mutual exclusion group set may refer to a set which is formed by at least one feature value set corresponding to at least one mutually exclusive action. The mutually exclusive action is an action irrelevant to the currently detected action and does not belong to actions of the natural behaviors of the user. The combination set may include a feature value set matching the target action which is currently being detected and a feature value set corresponding to at least one mutually exclusive action irrelevant to the currently detected action, that is to say, the combination set includes at least two feature value sets.

In an embodiment, according to the action satisfying the liveness detection condition, an action which is currently being detected may be determined as the target action, thus the feature value set matching the target action may be determined, and then at least one mutually exclusive action may be determined according to the mutual exclusion condition, so as to determine the feature value set matching the mutually exclusive action, then the mutual exclusion group set is generated according to the feature value set matching the at least one mutually exclusive action. When each feature value set in the mutual exclusion group set satisfies the extremum condition and monotone condition, a mutually exclusive action is recognized in the detection process of the target action, so as to determine that the photo or video simulation of a living body exists, so as to directly determine that the liveness detection fails, the liveness detection is stopped, and a warning prompt is outputted.

Through the configuration of the mutual exclusion condition, actions irrelevant to the currently detected action can be prevented from being detected, and photo or video attacks can be accurately detected. Thus, the action can be detected without using photos or videos to simulate a living body, so as to improve the accuracy of the liveness detection.

In an embodiment, the liveness detection includes an eye opening or closing action detection, a mouth opening or closing action detection, a head nodding action detection and head shaking action detection. As shown in table 1, it provides a correspondence between each action and a mutual exclusion group set. When the eye opening or closing action is detected, the mutual exclusion group set includes an opening or closing degree set, a pitch angle set and a rotation angle set; when the mouth opening or closing action is detected, the mutual exclusion group set includes a pitch angle set and a rotation angle set; when the head nodding action is detected, the mutual exclusion group set includes the opening or closing degree set and the rotation angle set; when the head shaking action is detected, the mutual exclusion group set includes the opening or closing degree set and the pitch angle set. In an embodiment, at least one set in the mutual exclusion group set satisfies both the corresponding extremum condition and the monotone condition, that is, satisfies the mutual exclusion condition.

TABLE 1

Correspondence between the action satisfying the liveness detection condition and the mutual exclusion group set

| | Closing Value Set | Opening or Closing Degree Set | Pitch Angle Set | Rotation Degree Set |
| --- | --- | --- | --- | --- |
| Eye Opening or Closing Action | | Belongs to the mutual exclusion group set | Belongs to the mutual exclusion group set | Belongs to the mutual exclusion group set |
| Mouth Opening or Closing Action | | | Belongs to the mutual exclusion group set | Belongs to the mutual exclusion group set |
| Head Nodding Action | | Belongs to the mutual exclusion group set | | Belongs to the mutual exclusion group set |
| Head Shaking Action | | Belongs to the mutual exclusion | Belongs to the mutual | |

TABLE 1-continued

Correspondence between the action satisfying the liveness
detection condition and the mutual exclusion group set

| Closing Value Set | Opening or Closing Degree Set | Pitch Angle Set | Rotation Degree Set |
|---|---|---|---|
| | exclusion group set | exclusion group set | |

In S260, in the process of a detection of at least one action satisfying the liveness detection condition, it is determined whether at least one feature value set in the combination set satisfies a complementation condition, if so, S270 is executed; otherwise, S280 is executed.

The complementation condition is a condition which defines that an occurable action irrelevant to the currently detected action is detected. It is determined that at least one feature value set, matching the complementation condition, in the combination set satisfies the complementation condition, which represents that an action irrelevant to the detection action is detected, and this action is a natural action of the user. It is to be understood that it represents that the user is a living body to a certain extent, that is to say, the probability of the user being a living body increases, so that the extremum condition of the liveness detection can be reduced, the standard of the liveness detection can be reduced, and legitimate users can pass the liveness detection more easily and quickly, so as to speed up the liveness detection.

Alternatively, the determination of at least one feature value set in the combination set satisfying the complementation condition may include steps described below, according to the complementation condition and the action satisfying the liveness detection condition, the complementation group set is determined in the combination set; if a second maximum feature value and a second minimum feature value determined in the at least one feature value set in the complementation group set both satisfy a corresponding extremum condition, and the second maximum feature value, the second minimum feature value, and at least one feature value between the second maximum feature value and the second minimum feature value satisfy the monotone condition, it is determined that the at least one feature value set in the combination set satisfies the complementation condition.

The complementation group set may refer to a set formed by feature value sets respectively corresponding to complementation actions. The complementation actions are actions, which belong to actions of the natural behaviors of the user, but irrelevant to the currently detected action.

In an embodiment, according to the action satisfying the liveness detection condition, the action which is currently being detected may be determined as the target action, thus the feature value set matching the target action may be determined, and then a complementation action may be determined according to the complementation condition, thus the feature value set matching the complementation action may be determined, then the complementation group set is generated according to at least one feature value set matching the at least one complementation action. When each feature value set of the complementation group set satisfies the extremum condition and monotone condition, it is determined that in the detection process of the target action, a natural action of the user is recognized, so as to improve the probability that the user is a living body. The extremum condition of the livenss detection can be modified to make the feature value to quickly reach the threshold defined in the extremum condition, therefore it is easier for legitimate users to pass through the liveness detection more quickly and easily.

Through the configuration of the complementation condition, when an action of natural postures of the user is detected, the extremum condition is modified to accelerate the speed of detection of a legitimate user and improve the efficiency of the liveness detection.

In an embodiment, the liveness detection includes an eye opening or closing action detection, a mouth opening or closing action detection, a head nodding action detection and a head shaking action detection. As shown in table. 2, it provides a correspondence between each action and a complementation group set. When the eye opening or closing action is detected, the complementation group set is empty; when the mouth opening or closing action is detected, the complementation group set includes the closing value set; when the head nodding action is detected, the complementation group set includes the closing value set; when the head shaking action is detected, the complementation group set includes the closing value set. At least one set in the complementation group set satisfies both the corresponding extremum condition and the monotone condition, that is, the at least one set satisfies the complementation condition.

TABLE 2

Correspondence between the action satisfying the liveness
detection condition and the complementation group set

| | Closing Value Set | Opening or Closing Degree Set | Pitch Angle Set | Rotation Angle Set |
|---|---|---|---|---|
| Eye Opening or Closing Action | | | | |
| Mouth Opening or Closing Action | Belongs to the complementation group set | | | |
| Head Nodding Action | Belongs to the complementation group set | | | |
| Head Shaking Action | Belongs to the complementation group set | | | |

In S270, at least two extremum conditions corresponding to the at least two feature value sets in the combination set are modified.

In an embodiment, modifying the extremum conditions may refer to modifying thresholds defined in the extremum conditions, for example, the maximum feature value threshold is reduced to a half of the original threshold, and the minimum feature value threshold is increased to twice of the original threshold.

All extremum conditions may be modified, or only an extremum condition corresponding to the feature value set matching the currently detected action may be modified. When the detection of a next action is performed, all extremum conditions may be initialized, or the modified extremum conditions may be continued to be used for the detection of the next action.

In S280, it is determined whether the liveness detection normal ending condition is satisfied; if so, S290 is executed; otherwise, S230 is executed.

The liveness detection normal ending condition refers to a condition which defines that the detection process of all actions ends normally. For example, each detected action is detected successfully or the detection time exceeds a set detection time. It is to be understood that if the mutual exclusion condition is unsatisfied, a liveness detection result of the user is determined according to the detection result of each action.

Generally, in the process of the liveness detection, the detection time is set for each action, and the display screen of the electronic device prompts the user to make an action matching the target action within the set detection time. If a user's action is detected, the next target action detection is continued; if the user's action is not detected within the set detection time, the detection result of the target action is determined as the verification failure, and the detection of the next target action is continued. The detection time of each action may be the same or different. When the detection process of all target actions ends normally, the liveness detection ends. When the detection results of all target actions are verified, that is, all target actions defined by at least one target action are detected, it is determined that the user passes the liveness detection, that is, the user is a living body.

In an embodiment, if the user does not make a face action posture that satisfies the liveness detection condition within the detection duration corresponding to the currently detected action, the detection result of the current detected action is determined as a failure. If the real-time acquired image frame at the current time is still within the detection duration corresponding to the currently detected action, the currently detected action is detected according to multiple feature value sets corresponding to the updated next image frame acquired in real time.

In S290, according to the detection result of at least one action satisfying the liveness detection condition, it is determined whether the user is a living body. When each detection result of the at least one action satisfying the liveness detection condition is successful, it is determined that the user is a living body.

This embodiment of the present disclosure can prevent random video attacks through the configuration of the mutual exclusion condition, and at the same time, through the configuration of the complementation condition, the extremum conditions can be modified, so as to accelerate the speed of the liveness detection of a legitimate user.

Embodiment Three

Figure 3:
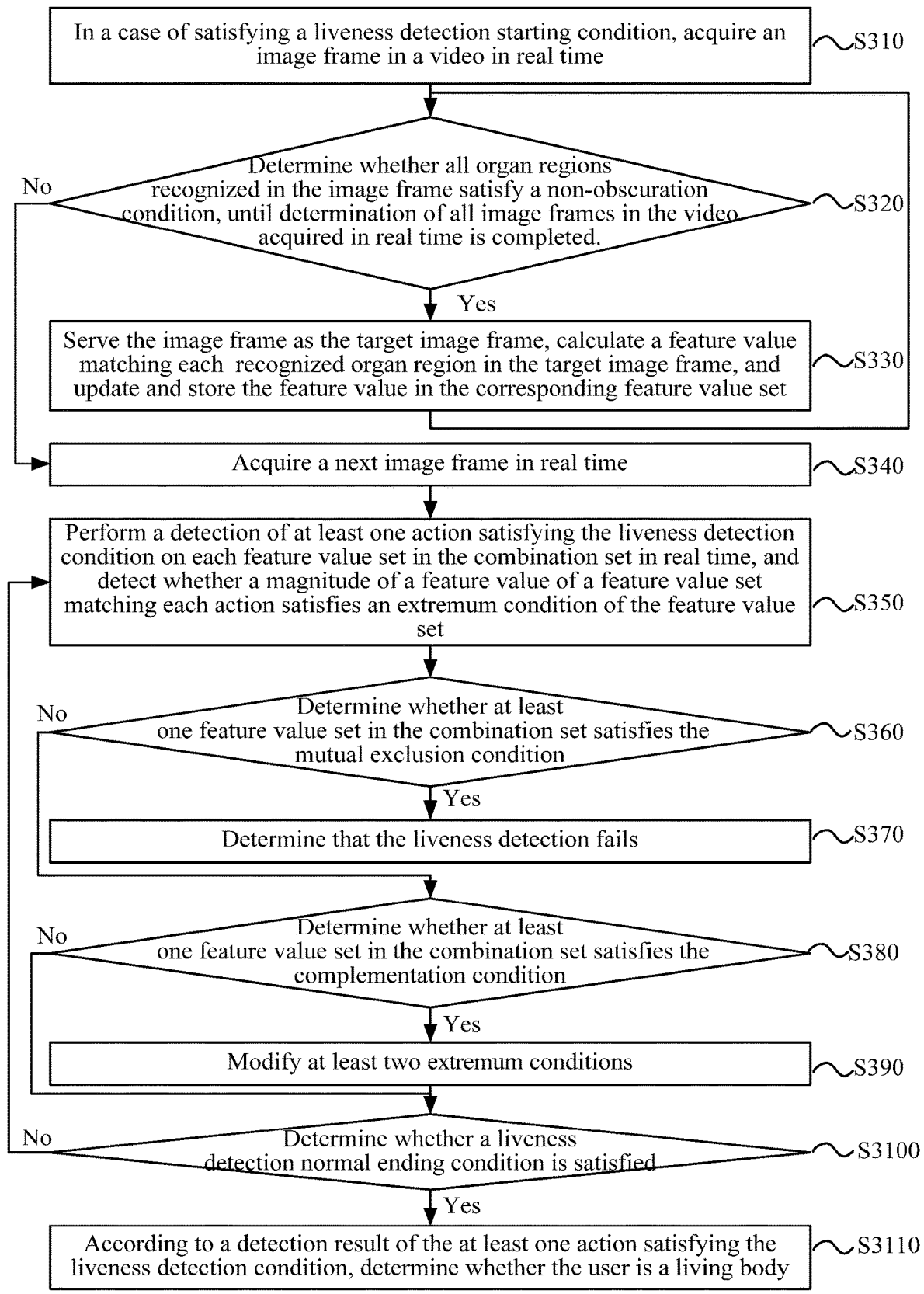
FIG. 3 is a flowchart of a liveness detection method according to an embodiment three of the present disclosure.

FIG. 3 is a flowchart of a liveness detection method provided in the embodiment three of the present disclosure. This embodiment is based on one or more alternative schemes described above.

Accordingly, the method of this embodiment may include S310 to S3110.

In S310, when it is determined that the liveness detection starting condition is satisfied, an image frame in the video is acquired in real time.

In this embodiment, the liveness detection starting condition, video, image frame, organ region, non-obscuration condition, extremum condition, feature value, feature value set, mutual exclusion condition, complementation condition, action satisfying liveness detection condition and liveness detection normal ending condition may refer to the descriptions in the above embodiments.

In S320, it is determined whether all organ regions recognized in the image frame satisfy the non-obscuration condition, until determination of all image frames in the video acquired in real time is completed, if so, S330 is executed; otherwise, S340 is executed.

In S330, the image frame is served as the target image frame, a feature value matching each organ region recognized in the target image frame is calculated, and the feature value is updated and stored into a corresponding feature value set, where each organ region corresponds to at least one feature value set, each feature value set corresponds to one extremum condition, each feature value set includes at least one feature value, and S320 is executed.

The feature value of each organ region may be detected by using a corresponding pre-trained machine learning model. The key point recognition may performed on each image frame, and an image frame with additional key point annotation data may be input into each machine learning model to acquire a respectively outputted feature value of each organ region.

In the training process of the machine learning model, at least one set of posture consistency samples, which are easily misdetermined, may be used as training samples to train the standard detection model to improve the accuracy of posture recognition of the standard detection model. In an embodiment, the set of pose consistency samples includes an original face image, at least one posture-transformed face image which satisfies a posture difference condition with the original face image, and a posture-transformed face image generated by affine transformation of the original face image. Posture parameters of each face image included in each set of posture consistency samples are configured to have a same standard posture parameter value. The standard detection model is an original machine learning model; the affine transformation includes at least one of translation, scaling, flipping, rotation and shearing; the posture parameters refer to parameters for representing a face posture, which may include at least one of a pitch angle, a rotation angle and a yaw angle.

The posture-transformed face image and the original face image are respectively input to traditional face posture detection methods (such as the least square method) or deep learning models completed through historical training, the output results are different, but in fact the posture parameters from the two methods are the same. Therefore, the posture-transformed face image and the original face image are respectively used as training samples to improve the representativeness of samples, and training the standard detection model can improve the accuracy of the posture recognition of the trained standard detection model.

In S340, a next image frame is acquired in real time.

In S350, according to the posture variation of each organ region, a detection of at least one action satisfying the liveness detection condition is performed on each feature value set in the combination set in real time, and whether a magnitude of a feature value in a feature value set matching each action satisfies an extremum condition of the feature value set is detected.

In S360, in the process of the detection of the at least one action satisfying the liveness detection condition, it is determined whether at least one feature value set in the combination set satisfies the mutual exclusion condition, if so, S370 is executed; otherwise, S380 is executed. In S370, it is determined that the liveness detection fails.

In S380, in the process of the detection of at least one action satisfying the liveness detection condition, it is determined whether at least one feature value set in the combination set satisfies the complementation condition, if so, S390 is executed; otherwise, S3100 is executed.

In S390, the at least two extremum conditions are modified.

In S3100, it is determined whether the liveness detection normal ending condition is satisfied, if so, S3110 is executed; otherwise, S350 is executed.

In S3110, according to the detection result of at least one action satisfying the liveness detection condition, it is determined whether the user is a living body.

Embodiment Four

Figure 4:
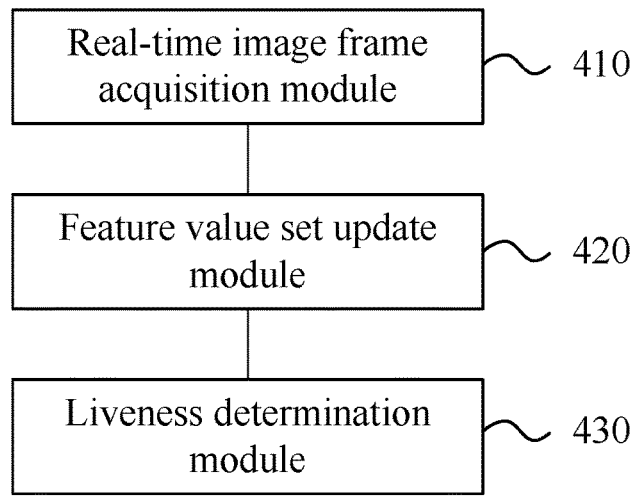
FIG. 4 is a schematic diagram illustrating a structure of a liveness detection apparatus according to an embodiment four of the present disclosure.

FIG. 4 is a schematic diagram illustrating the structure of a liveness detection apparatus according to this embodiment of the present disclosure. This embodiment may be suitable for detecting whether a user in a real-time recorded video is a living body. This apparatus may be implemented by software or hardware, and may be disposed in an electronic device. As shown in FIG. 4, the apparatus may include a real-time image frame acquisition module 410, a feature value set update module 420 and a liveness detection module 430.

The real-time image frame acquisition module 410 is configured to acquire an image frame in a video in real time when a liveness detection starting condition is satisfied.

The feature value set update module 420 is configured to recognize, in the image frame, at least two organ regions of a user, and update a feature value set corresponding to each of the at least two recognized organ regions according to a feature value calculated based on each recognized organ region, where each organ region corresponds to at least one feature value set, each feature value set corresponds to one extremum condition, and each feature value set includes at least one feature value. The liveness determination module 430 is configured to perform a liveness detection of a user according to data features in a combination set formed by at least two feature value sets corresponding to the at least two organ regions, and extremum conditions respectively corresponding to the at least two feature value sets.

In this embodiment of the present disclosure, the image frame in the video recording the user's face image is acquired in real time, and the feature value of each organ region recognized in each image frame is calculated, and the corresponding feature value set is updated. Multiple data features in the combination set formed by the at least two feature value sets and the extremum condition corresponding to each of the at least two feature value sets are subjected to the liveness detection, which can jointly determine whether the user has performed an action specified in the liveness detection based on multiple associated feature value sets. The limitation of the liveness detection based on only one feature value set is avoided, and in the related art, using photos or videos to pass through the liveness detection is avoided, the misdetermination of the liveness detection is reduced, the accuracy of the liveness detection and the security of identity authentication are improved In an embodiment, the liveness determination module 430 includes an extremum condition determination sub-module, which is configured to select, from the feature value sets matching the at least two organ regions, at least two feature value sets matching a liveness detection condition to generate the combination set.

According to the data features in the combination set, a magnitude variation of a feature value in each feature value set is determined, and a posture variation, matching the magnitude variation of the feature value in each feature value set, of each organ region is determined; according to the posture variation of each organ region, a detection of at least one action satisfying the liveness detection condition is performed on each feature value set in the combination set in real time, and whether a magnitude of a feature value in a feature value set matching each action satisfies an extremum condition of the feature value set is detected.

In an embodiment, the apparatus further includes a mutual exclusion condition determination module and a complementation condition determination module.

The mutual exclusion condition determination module is configured to determine that the liveness detection fails, in response to the determination result that at least one feature value set in the combination set satisfies the mutual exclusion condition, in a process of the detection of at least one action satisfying the liveness detection condition; the complementation condition determination module is configured to modify at least two extremum conditions corresponding to the at least two feature value sets in the combination set, in response to the determination result that at least one feature value set in the combination set satisfies the complementation condition, in the process of the detection of the at least one action satisfying the liveness detection condition; and the mutual exclusion condition is a condition for detecting an action irrelevant to a currently detected action; the complementation condition is a condition where an occurable action irrelevant to the currently detected action is detected.

In an embodiment, the apparatus further includes a liveness detection module.

The liveness detection module is configured to determine that a user is a living body according to a result that each detection result of the at least one action satisfying the liveness detection condition is successful, when a liveness detection normal ending condition is satisfied.

In an embodiment, the mutual exclusion determination module includes a mutual exclusion group set determination sub-module and a mutual exclusion group set detection sub-module, the mutual exclusion group set determination sub-module is configured to determine a mutual exclusion group set in the combination set according to the mutual exclusion condition and the action satisfying the liveness detection condition; the mutual exclusion group set detection sub-module is configured to determine that at least one feature value set in the combination set satisfies the mutual exclusion condition, in response to both a first maximum feature value and a first minimum feature value determined in at least one feature value set of the mutual exclusion set satisfying at least one extremum condition corresponding to the at least one feature value set, and the first maximum feature value, the first minimum feature value and at least one feature value between the first maximum feature value and the first minimum feature value satisfying a monotone condition.

In an embodiment, the complementation condition determination module includes a complementation group set determination sub-module and a complementation group set detection sub-module, the complementation group set determination sub-module is configured to determine a complementation group set in the combination set according to the complementation condition and the action satisfying the liveness detection condition; the complementation group set detection sub-module is configured to determine that at least one feature value set in the combination set satisfies the complementation condition, in response to both a second maximum feature value and a second minimum feature value determined in at least one feature value set of the complementation group set satisfying at least one maximum and minimum value condition respectively corresponding to the at least one feature value set, and the second maximum feature value, the second minimum feature value, and at least one feature value between the second maximum feature value and the second minimum feature value satisfying a monotone condition. In an embodiment, the feature value set update module 420 includes an obscuration determination sub-module, which is configured to: calculate, for each organ region, a feature value matching the organ region in the target image frame, if it is determined that the organ region recognized in the image frame satisfies the non-obscuration condition, and update and store the feature value in a feature value set corresponding to the organ region matching the feature value.

In an embodiment, the obscuration determination sub-module includes an obscuration determination network model detection unit and an obscuration detection unit, the obscuration determination network model detection unit is configured to: for each organ region, input the image frame into a pre-trained obscuration determination network model matching the organ region, and acquire an obscuration determination result, output by the obscuration determination network model, of the organ region in the image frame; the obscuration detection unit is configured to determine that the organ region satisfies the non-obscuration condition, when the obscuration determination result of the organ region is non-obscured; and the obscuration determination sub-module is configured to determine the image frame, in which each organ region recognized satisfies the non-obscuration condition, as the target image frame.

In an embodiment, the apparatus further includes an action condition detection module, which is configured to determine that a detection result of the action is successful, when both a third maximum feature value and a third minimum feature value determined in a feature value set, which matches an action satisfying the liveness detection condition, satisfy a maximum and minimum value condition of the feature value set, and the third maximum feature value, the third minimum feature value, and at least one feature value between the third maximum feature value and the third minimum feature value satisfy a monotone condition.

The liveness detection apparatus according to this embodiment of the present disclosure belongs to the same concept as the liveness detection method according to the embodiment one. The technical details not described in this embodiment of the present disclosure can be referred to the embodiment one, and this embodiment of the present disclosure and embodiment one of the present disclosure have the same effect.

Embodiment Five

Figure 5:
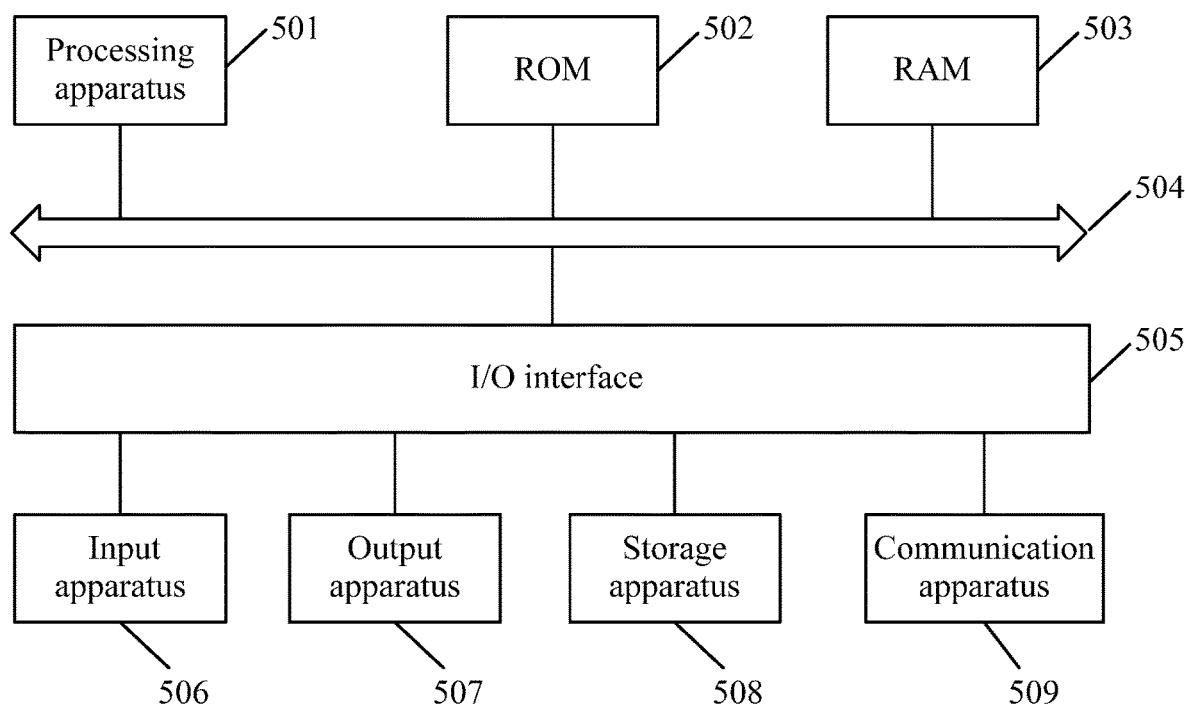
FIG. 5 is a schematic diagram illustrating a structure of an electronic device according to an embodiment five of the present disclosure.

The embodiments of the present disclosure provide an electronic device. With reference to FIG. 5, a schematic diagram illustrating a structure of an electronic device (such as a terminal device or a server) 500 suitable for implementing the embodiments of the present disclosure is shown. The electronic device in the embodiments of the present disclosure may include a mobile terminal, such as a mobile phone, a laptop, a digital broadcast receiver, a personal digital assistant (PDA), a tablet computer, a personal multimedia player (PMP) or an in-vehicle terminal (for example, an in-vehicle navigation terminal), and a stationary terminal such as a digital television (TV), or a desktop computer. The electronic device shown in FIG. 5 is only an example and should not impose any limitation on the functionality and usage scope of the embodiments of the present disclosure.

As shown in FIG. 5, the electronic device 500 may include a processing apparatus (such as a central processing unit, a graphics processing unit) 501. The processing apparatus 502 can execute, according to a program stored in a read-only memory (ROM) 503 or a program loaded into a random access memory (RAM) 503 from a storage apparatus 508, various appropriate actions and processing. In the RAM 503, various programs and data required for the operation of the electronic device 500 are also stored. The processing apparatus 501, ROM 502, and RAM 503 are connected to each other through a bus 504. An input/output (I/O) interface 505 is also connected to the bus 504.

The apparatus below may be connected to the I/O interface 505, including an input apparatus 506 such as a touch screen, a touch pad, a keyboard, a mouse, a camera, a microphone, an accelerometer and a gyroscope, an output apparatus 507 such as a liquid crystal display (LCD), a speaker and a vibrator, a storage apparatus 508 such as a magnetic tape or a hard disk, and a communication apparatus 509. The communication apparatus 509 may allow the electronic device 500 to perform wireless or wired communications with other devices to exchange data. Although FIG. 5 shows the electronic device 500 that may have various apparatuses, it is to be understood that it is not required to implement or have all shown apparatuses. The present disclosure may alternatively implement or provide more or fewer apparatuses.

According to the embodiments of the present disclosure, the process described above with reference to the flowcharts may be implemented as a computer software program. For example, the embodiments of the present disclosure include a computer program product. The computer program product includes a computer program carried on a computer-readable medium, and the computer program includes program codes for performing the methods shown in the flowcharts. In this embodiment, the computer program may be downloaded from a network through the communication apparatus 509 and then installed, or may be installed from the storage apparatus 508, or may be installed from the ROM 502. When the computer program is executed by the processing apparatus 501, the preceding functions defined in the methods of this embodiment of the present disclosure are executed.

Embodiment Six

The embodiments of the present disclosure further provide a computer-readable storage medium. The computer-readable medium may be a computer-readable signal medium, or a computer-readable storage medium or a combination of the two media. The computer-readable storage medium may be an electrical, magnetic, optical, electromagnetic, infrared or semiconductor system, apparatus or device, or any combination thereof. More computer-readable storage medium examples include an electrical connection having one or more wires, a portable computer magnetic disk, a hard disk, a RAM, a ROM, an erasable programmable read only memory (EPROM) or flash memory, an optical fiber, a portable compact disc read-only memory (CD-ROM), an optical memory device, a magnetic memory device, or any suitable combination thereof. In the present disclosure, the computer-readable storage medium may be any tangible medium including or storing a program. The program can be used by or used in conjunction with an instruction execution system, apparatus or device. In the present disclosure, the computer-readable signal medium may include a data signal propagated on a base band or as a part of a carrier wave. Computer-readable program codes are carried in the data signal. This propagated data signal may take multiple forms including an electromagnetic signal, an optical signal, or any suitable combination thereof. The computer-readable signal medium may further be any computer-readable medium other than a computer-readable storage medium. The computer-readable signal medium may send, propagate or transmit a program used by or used in conjunction with an instruction execution system, apparatus or device. The program codes included in the computer-readable medium may be transmitted in any suitable medium, including a wire, an optical cable, a radio frequency (RF), or any suitable combination thereof.

The preceding computer-readable medium may be included in the preceding electronic device, or may exist alone without being assembled into the electronic device.

The computer-readable medium carries one or more programs. When the one or more programs are executed by the electronic device, which causes the electronic device to execute steps described below, when the liveness detection starting condition is satisfied, the image frame in the video is acquired in real time. At least two organ regions of the user are recognized in the image frame, and the feature value set corresponding to each recognized organ region is updated according to the feature value calculated based on the each recognized organ region, where each organ region corresponds to at least one feature value set, each feature value set corresponds to one extremum condition, and each feature value set includes at least one feature value. According to data features in a combination set formed by at least two feature value sets corresponding to the at least two organ regions, and the extremum conditions respectively corresponding to the at least two feature value sets, the liveness detection is performed on the user.

Computer program codes for performing the operations of the present disclosure may be written in one or more programming languages or a combination thereof. The one or more programming languages include an object-oriented programming language such as Java, Smalltalk and C++, as well as a conventional procedural programming languages such as "C" language or similar programming languages. The program codes can be entirely executed on a user computer, partially executed on the user computer, executed as an independent software package, partially executed on the user computer and partially on a remote computer, or entirely executed on the remote computer or a server. In a case of involving the remote computer, the remote computer can be connected to the user computer via one or more kinds of networks including a local area network (LAN) or a wide area network (WAN), or can be connected to an external computer (for example, via the Internet through an Internet service provider).

The flowcharts and block diagrams in the drawings show the realizable architecture, functions and operations according to the system, method and computer program product of one or more embodiments of the present disclosure. Each block in the flowcharts or block diagrams may represent a module, a program segment or part of codes. The module, the program segment or the part of codes includes one or more executable instructions for implementing specified logical functions. In some alternative implementations, the functions marked in the blocks may occur in an order different than those marked in the drawings. For example, two sequential blocks may, in fact, be executed substantially in parallel, or sometimes executed in the reverse order, which depends on the involved functions. Each block of the block diagrams and/or flowcharts, and combinations of blocks in the block diagrams and/or flowcharts may be implemented by a dedicated hardware-based system that performs a specified function or operation, or be implemented by a combination of dedicated hardware and computer instructions.

The described modules involved in this embodiment of the present disclosure may be implemented by software or be implemented by hardware. The name of the module does not constitute a limitation on the module itself under certain circumstances. For example, the real-time image frame acquisition module can also be described as "a module that acquires an image frame in a video in real time when it is determined that a liveness detection starting condition is satisfied".

What is claimed is:

1. A liveness detection method, comprising:
in a case of satisfying a liveness detection starting condition, acquiring an image frame in a video in real time;
recognizing, in the image frame, at least two organ regions of a user, and updating a feature value set corresponding to each of the at least two recognized organ regions according to a feature value calculated based on the recognized organ region corresponding to the feature value set, wherein each of the at least two organ regions corresponds to at least one feature value set, each of the at least one feature value set corresponds to one extremum condition, and each of the at least one feature value set comprises at least one feature value; and
performing a liveness detection on the user according to data features in a combination set formed by at least two feature value sets corresponding to the at least two organ regions and extremum conditions respectively corresponding to the at least two feature value sets;
wherein performing the liveness detection on the user according to the data features in the combination set formed by the at least two feature value sets corresponding to the at least two organ regions and according to the extremum conditions respectively corresponding to the at least two feature value sets comprises:
selecting, from feature value sets matching the at least two organ regions, the at least two feature value sets matching a liveness detection condition to generate the combination set
determining, according to the data features in the combination set, a magnitude variation of the feature value in each feature value set, and determining a posture variation, matching the magnitude variation of the feature value in each feature value set, of each organ region; and
performing, according to the posture variation of each organ region, a detection of at least one action satisfying the liveness detection condition on each feature value set in the combination set in real time, and detecting whether a magnitude of a feature value in a feature value set matching each action satisfies an extremum condition of the feature value set;
wherein performing the liveness detection on the user according to the data features in the combination set formed by the at least two feature value sets corresponding to the at least two organ regions and according to the extremum conditions respectively corresponding to the at least two feature value sets further comprises:
in a process of the detection of the at least one action satisfying the liveness detection condition, in a case of at least one feature value set in the combination set satisfying a mutual exclusion condition, determining that the liveness detection fails; and in the process of the detection of the at least one action satisfying the liveness detection condition, in a case of at least one feature value set in the combination set satisfying a complementation condition, modifying the at least two extremum conditions corresponding to the at least two feature value sets in the combination set;

wherein the mutual exclusion condition is a condition where an action irrelevant to a currently detected action is detected, and the complementation condition is a condition where an occurable action irrelevant to the currently detected action is detected.

2. The method of claim 1, further comprising:

in a case of satisfying a liveness detection normal ending condition, determining that the user is a living body according to a result that each detection result of the at least one action satisfying the liveness detection condition is successful, wherein the liveness detection normal ending condition comprises that each detected action is detected successfully or detection time exceeds a set detection duration.

3. The method of claim 1, wherein determining that the at least one feature value set in the combination set satisfies the mutual exclusion condition comprises:

determining a mutual exclusion group set in the combination set according to the mutual exclusion condition and the at least one action satisfying the liveness detection condition; and determining that the at least one feature value set in the combination set satisfies the mutual exclusion condition, in response to both a first maximum feature value and a first minimum feature value determined in the at least one feature value set of the mutual exclusion group set satisfying at least one extremum condition respectively corresponding to the at least one feature value set, and the first maximum feature value, the first minimum feature value, and at least one feature value between the first maximum feature value and the first minimum feature value satisfying a monotone condition.

4. The method of claim 1, wherein determining that the at least one feature value set in the combination set satisfies the complementation condition comprises:

determining a complementation group set in the combination set according to the complementation condition and the at least one action satisfying the liveness detection condition; and determining that the at least one feature value set in the combination set satisfies the complementation condition, in response to both a second maximum feature value and a second minimum feature value determined in the at least one feature value set of the complementation group set satisfying at least one extremum condition respectively corresponding to the at least one feature value set, and the second maximum feature value, the second minimum feature value, and at least one feature value between the second maximum feature value and the second minimum feature value satisfying a monotone condition.

5. The method of claim 1, wherein updating the feature value set corresponding to each of the at least two recognized organ regions according to the feature value calculated based on the recognized organ region corresponding to the feature value set comprises:

determining the image frame, in which each recognized organ region satisfies a non-obscuration condition, as a target image frame, calculating a feature value matching each organ region in the target image frame, and updating and storing the feature value into a feature value set corresponding to the each organ region matching the feature value.

6. The method of claim 5, wherein determining that all recognized organ regions in the image frame satisfy the non-obscuration condition comprises:

for each organ region, inputting the image frame into a pre-trained obscuration determination network model matching the organ region, and acquiring an obscuration determination result, output by the obscuration determination network model, of the organ region in the image frame; and in a case where the obscuration determination result of the organ region is non-obscured, determining that the organ region satisfies the non-obscuration condition.

7. The method of claim 1, after detecting whether the magnitude of the feature value in the feature value set matching each action satisfies the extremum condition of the feature value set, further comprising:

determining that a detection result of an action is successful, in a case where a third maximum feature value and a third minimum feature value determined in a feature value set, which matches the action satisfying the liveness detection condition, satisfy an extremum condition of the feature value set, and the third maximum feature value, the third minimum feature value, and at least one feature value between the third maximum feature value and the third minimum feature value satisfy a monotone condition.

8. A liveness detection apparatus, comprising:

at least one processor; and a memory, configured to store the at least one program;

wherein the at least one program, when executed by the at least one processor, causes the at least one processor to implement:

in a case of satisfying a liveness detection starting condition, acquiring an image frame in a video in real time;

recognizing, in the image frame, at least two organ regions of a user, and updating a feature value set corresponding to each of the at least two recognized organ regions according to a feature value calculated based on the recognized organ region corresponding to the feature value set, wherein each of the at least two organ regions corresponds to at least one feature value set, each of the at least one feature value set corresponds to one extremum condition, and each of the at least one feature value set comprises at least one feature value; and performing a liveness detection on the user according to data features in a combination set formed by at least two feature value sets corresponding to the at least two organ regions and extremum conditions respectively corresponding to the at least two feature value sets;

wherein the at least one program, when executed by the at least one processor, causes the at least one processor to implement performing the liveness detection on the user according to the data features in the combination set formed by the at least two feature value sets corresponding to the at least two organ regions and according to the extremum conditions respectively corresponding to the at least two feature value sets by:

selecting, from feature value sets matching the at least two organ regions, the at least two feature value sets matching a liveness detection condition to generate the combination set;

determining, according to the data features in the combination set, a magnitude variation of the feature value in each feature value set, and determining a posture variation, matching the magnitude variation of the feature value in each feature value set, of each organ region; and performing, according to the posture variation of each organ region, a detection of at least one action satisfying the liveness detection condition on each feature value set in the combination set in real time, and detecting whether a magnitude of a feature value in a feature value set matching each action satisfies an extremum condition of the feature value set;

wherein the at least one program, when executed by the at least one processor, causes the at least one processor to implement performing the liveness detection on the user according to the data features in the combination set formed by the at least two feature value sets corresponding to the at least two organ regions and according to the extremum conditions respectively corresponding to the at least two feature value sets further by:

in a process of the detection of the at least one action satisfying the liveness detection condition, in a case of at least one feature value set in the combination set satisfying a mutual exclusion condition, determining that the liveness detection fails; and in the process of the detection of the at least one action satisfying the liveness detection condition, in a case of at least one feature value set in the combination set satisfying a complementation condition, modifying the at least two extremum conditions corresponding to the at least two feature value sets in the combination set;

wherein the mutual exclusion condition is a condition where an action irrelevant to a currently detected action is detected, and the complementation condition is a condition where an occurable action irrelevant to the currently detected action is detected.

9. The apparatus of claim 8, wherein the at least one program, when executed by the at least one processor, causes the at least one processor to further implement:

in a case of satisfying a liveness detection normal ending condition, determining that the user is a living body according to a result that each detection result of the at least one action satisfying the liveness detection condition is successful, wherein the liveness detection normal ending condition comprises that each detected action is detected successfully or detection time exceeds a set detection duration.

10. The apparatus of claim 8, wherein the at least one program, when executed by the at least one processor, causes the at least one processor to implement determining that the at least one feature value set in the combination set satisfies the mutual exclusion condition by:

determining a mutual exclusion group set in the combination set according to the mutual exclusion condition and the at least one action satisfying the liveness detection condition; and determining that the at least one feature value set in the combination set satisfies the mutual exclusion condition, in response to both a first maximum feature value and a first minimum feature value determined in the at least one feature value set of the mutual exclusion group set satisfying at least one extremum condition respectively corresponding to the at least one feature value set, and the first maximum feature value, the first minimum feature value, and at least one feature value between the first maximum feature value and the first minimum feature value satisfying a monotone condition.

11. The apparatus of claim 8, wherein the at least one program, when executed by the at least one processor, causes the at least one processor to implement determining that the at least one feature value set in the combination set satisfies the complementation condition by:

determining a complementation group set in the combination set according to the complementation condition and the at least one action satisfying the liveness detection condition; and determining that the at least one feature value set in the combination set satisfies the complementation condition, in response to both a second maximum feature value and a second minimum feature value determined in the at least one feature value set of the complementation group set satisfying at least one extremum condition respectively corresponding to the at least one feature value set, and the second maximum feature value, the second minimum feature value, and at least one feature value between the second maximum feature value and the second minimum feature value satisfying a monotone condition.

12. The apparatus of claim 8, wherein the at least one program, when executed by the at least one processor, causes the at least one processor to implement updating the feature value set corresponding to each of the at least two recognized organ regions according to the feature value calculated based on the recognized organ region corresponding to the feature value set by:

determining the image frame, in which each recognized organ region satisfies a non-obscuration condition, as a target image frame, calculating a feature value matching each organ region in the target image frame, and updating and storing the feature value into a feature value set corresponding to the each organ region matching the feature value.

13. The apparatus of claim 12, wherein the at least one program, when executed by the at least one processor, causes the at least one processor to implement determining that all recognized organ regions in the image frame satisfy the non-obscuration condition by:

for each organ region, inputting the image frame into a pre-trained obscuration determination network model matching the organ region, and acquiring an obscuration determination result, output by the obscuration determination network model, of the organ region in the image frame; and in a case where the obscuration determination result of the organ region is non-obscured, determining that the organ region satisfies the non-obscuration condition.

14. The apparatus of claim 8, wherein after detecting whether the magnitude of the feature value in the feature value set matching each action satisfies the extremum condition of the feature value set, the at least one program causes the at least one processor to further implement:

determining that a detection result of an action is successful, in a case where a third maximum feature value and a third minimum feature value determined in a feature value set, which matches the action satisfying the liveness detection condition, satisfy an extremum condition of the feature value set, and the third maximum feature value, the third minimum feature value, and at least one feature value between the third maximum feature value and the third minimum feature value satisfy a monotone condition.

15. A non-transitory computer-readable storage medium, storing a computer program, wherein the computer program, when executed by a processor, performs the method of claim 1.

* * * * *